April 28, 1970 B. A. GRUBER 3,508,694
SECONDARY FUNCTION TAPE CELL
Filed March 6, 1968
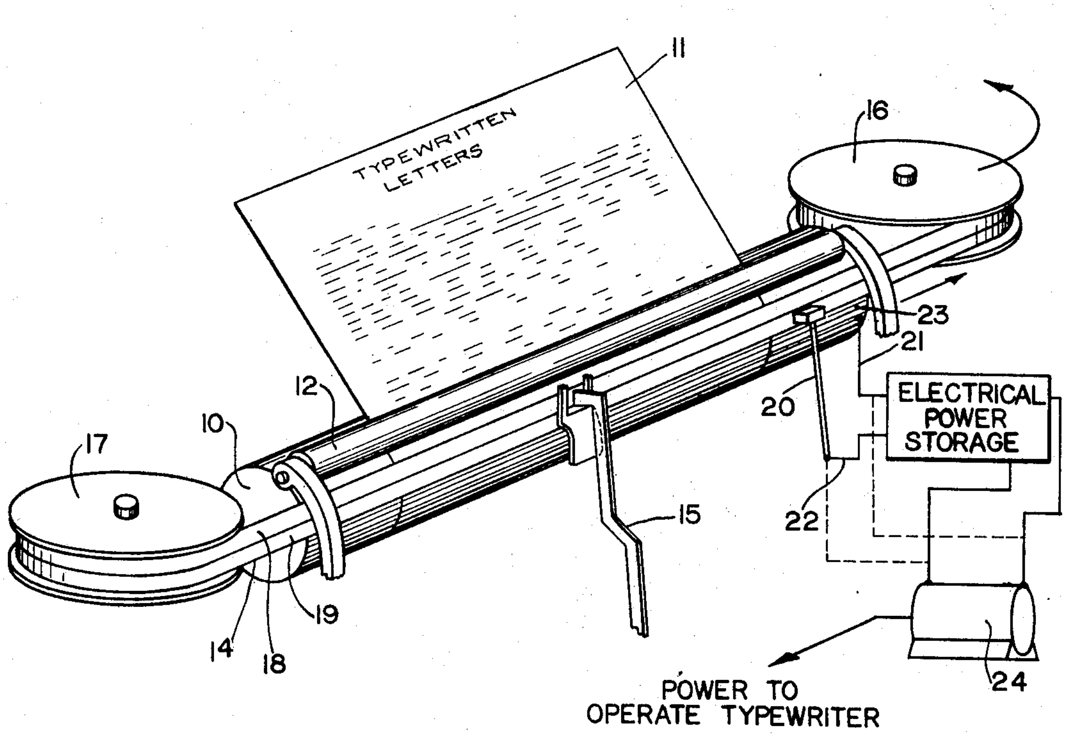
INVENTOR
BERNARD A. GRUBER
BY John M. Brandt
AGENT 3,508,694
SECONDARY FUNCTION TAPE CELL Bernard A. Gruber, Cambridge, Mass., assignor to Monsanto Research Corporation, St. Louis, Mo., a corporation of Delaware Continuation-in-part of application Ser. No. 538,249, Mar. 29, 1966. This application Mar. 6, 1968, Ser. No. 710,950
Int. Cl. B65h 17/22; H01m 27/00
U.S. Cl. 226—188 3 Claims

ABSTRACT OF THE DISCLOSURE

Electrically powered self-actuated apparatus for recording information utilizing electrical power drawn from electrochemical cell reaction components carried by the tape in which the tape both electrochemically actuates its own motion and records information.

This application is a continuation-in-part of my copending application S.N. 538,249, filed Mar. 29, 1966, now abandoned, which was a continuation-in-part of S.N. 232,144, filed Oct. 22, 1962 now U.S. Patent 3,260,620.

This invention relates to electrochemical systems, and more particularly, provides apparatus for actuating motion of an information-recording tape.

It is an object of this invention to provide novel apparatus for electrochemically actuating motion.

A particular object is to provide novel apparatus for actuating tape motion in which the tape both electrochemically actuates its own motion and records information.

An additional object of this invention is to provide novel tapes of information-recording material carrying electrochemical cell reactants on an electrolytically permeable base, disposed to permit use of the tape for recording information.

These and other objects will become evident upon consideration of the following specification and claims.

In accordance with the present invention, there is now provided a novel method for moving an information-recording tape, comprising utilizing electrical power drawn from electrochemical cell reaction components carried by the tape to actuate motion of the tape past sites at which information is recorded by the tape, and past active electrode sites from which said power is drawn.

In a particularly preferred embodiment of this invention, the process of recording information by the tape activates the electrochemical cell system on the tape, supplying power to move it.

Also provided by this invention are tapes of information-recording material, carrying electrochemical cell reaction components on an electrolytically permeable base, disposed to permit use of the tape for recording information.

Various equipment is commonly employed in which a tape is moved past a fixed position at which information is recorded by the tape. For example, these include electrical typewriter ribbons, sound recording tape, adding machine or cash register tapes, camera films, and the like. Some of these record information by transfer of marking indicia to other surfaces, such as typewriter ribbons. Some, such as sound recording tape, cash register tape, and camera film, record information and store it on the tape. In either case, information is recorded by the tape.

It is usual to actuate the advancing motion of such tapes electrically. Portable devices are powered by dry cells, for example.

The present invention provides a method of moving a tape in such devices with electrical power drawn from a supply of electrochemical reactants carried by the tape, so that it is self-actuating.

In a preferred embodiment of this invention, a fluid component of the electrochemical system on the tape is enclosed in rupturable capsules. Release of the fluid activates the system. In various of the systems discussed above, the tape is struck or indented by information-recording means, such as the keys of a typewriter or the needle of a recording device. Such rupturing forces can be applied to the tape at the information-recording point above or at the recording point and a place on the tape removed from the recording point. Thus the force can be used both to release fluid from capsule to activate the electrochemical system on the tape, providing power to move it, and also to perform their normal function of recording information.

The electrochemical system on the tape of this invention operates as a fuel cell, as described in my above-identified application.

By a fuel cell is meant a device for electrochemical generation of electricity which is provided with a continuous supply of the chemicals by the reaction of which the electricity is generated, and means to remove the products of reaction. A flashlight battery lasts no longer than its self-contained supply of the electrochemical reagents. An automobile battery depends on frequent periodic charging by a mechanical generator for prolonging its life. The theory of a fuel cell is that the cell will continue to deliver electricity for so long as the reactants are supplied to the cell and reaction products removed so as to maintain a substantially invariant system.

In practice, it has been found difficult to realize this ideal. One factor presenting particular difficulty in effective cell design is the separator between the cell electrodes. Use of stationary separators in fuel cells is often not entirely satisfactory. Their life is short, where active, strong chemical reagents are used as fuel cell materials. Another item causing difficulty in fuel cell operation is polarization of the electrodes. Still another difficulty sometimes of concern in fuel cell technology is design of conveniently transportable units.

These disadvantages can be obviated by employing a fuel cell construction in which the electrolytic connection between the current collectors is made through a separator which moves past the active electrode sites. Preferably, the separator acts as a carrier for at least one of the cell electrochemical reaction components, and still more preferably, the separator which moves past the active electrode sites is a dry tape carrier of the cell electrochemical reaction components.

What is meant herein by the active electrode site is the site of the introduction or withdrawal of electrons to or from the electrolyte. The term electrode is sometimes given this restrictive meaning, but is generally used to designate, broadly, a device for the accomplishment of this result. Most of the electrode, in this broader sense of the term, is a current collector, with the function of conducting electrons to or from the site of their exchange with the electrolyte.

In fuel cells employing moving separators, as will become evident hereinafter, the functions of current collector and producing exchange of electrons with the electrolyte may require distinction, in some cases. For the purposes of discussion, the portion of the electrode actively participating in the electron/electrolyte exchange may be identified as the active electrode, and the remainder of the conductive material, as passive electrode. The active electrode material may actually be carried to the site of the electrochemical reaction by the separator, as will be seen from the following discussion, whereby it becomes the active electrode when the separator contacts the current collector and provides the electrolytic path between the active electrode sites.

Fuel cells are inherently dynamic systems, which necessarily provide for the inflow and outgo of reactants and products. Yet designs for them have ordinarily taken the static approach of the closed systems of conventional LeClanché cells and the like. The electrode separator of a fuel cell is a part which has conventionally been designed for static operation. By provision of a separator which moves past the active electrode sites in a fuel cell, it is found that a variety of considerable advantages can be gained.

This tape separator may be arranged so that after passage between electrodes, it exits from the electrochemical zone to be treated as cell operational waste. In this case, an advantage will be that the tape separator can be made of inexpensive porous material, which will permit ion transfer while preventing direct mixing of the fuel and oxidant reactants. Porous separators with pores of sufficient size to permit physical transport of chemical molecules eventually permit the reactants to diffuse through and mix. But if the porous separator is continually moved away from the electrode zone to which the reactants are fed, before the reactants have travelled completely through the separator, then this mixing of the reactants is prevented.

Moreover, this invention can advantageously be applied in a fuel cell including highly reactive materials, such as a cell using an acid electrolyte. By employing a disposable separator, so that before attack of the fuel cell reactant on the separator has proceeded far enough for the separator to fail, the portion of the separator exposed to this reactant has been moved away and out of the cell, the problem of separator failure is alleviated.

A significant factor in preventing optimum performance of fuel cells is polarization of the electrodes. The polarization can be shown to be made up of several different components, one of which is concentration polarization. Concentration polarization produces mass transfer limitations on the performance of the electrodes. A finite amount of time is required for the reactants to reach active sites at the electrode where they can undergo the electrochemical reaction (oxidation or reduction) and to be removed from such active sites, leaving the sites available for further reactant to occupy them.

The movement of the separator to and away from the electrodes can assist in conducting this process of reactant transfer. The process of diffusion is supplemented by a physical transporting action. The tape can pick up intermediate or ultimate reaction products and assist in conveying them away from the electrode.

If desired, the electrodes can be arranged to rotate while the moving separator runs between them. Thus for example the friction of the separator moving between the electrodes, set under proper tension, can cause appropriately mounted electrodes to rotate so that the point at which the electrodes contact each other is continually changing. This means that the active portion of the electrode is continually being moved away from the electrochemical reaction site, and allowed to rest (depolarize) until the rotating movement has carried it back to the electrochemical site. It is known that polarization decreases and eventually disappears when an electrode is out of operation. With the active portion of rotating electrodes continually changing, the remainder of the electrode is continually being held out of operation, thus alleviating polarization.

The tape will advantageously serve as a carrier for one or more of the fuel cell components. For example, while the electrode separator must prevent the direct mixing of the fuel being supplied to the anode and the oxidant being supplied to the cathode in a fuel cell, to provide the necessary electrical connection between the two electrodes, an electrolytically conductive medium must permeate the separator. To accomplish this, the moving tape separator may be routed through a bath of electrolyte during its travel path to the electrode sites at which the fuel and oxidant are supplied. Then as the fuel contacts the anode in the presence of the electrolyte on one side of the separator, and the oxidant contacts the cathode in the presence of the electrolyte on the opposite side of the separator, they can each undergo their respective electrochemical reactions while the electrolyte-impregnated separator provides the conductive path between the electrodes.

The separator preferably also supplies the fuel and oxidant to the electrode sites. For example, a tape may be coated with magnesium, which is a consumable anode material. The magnesium is carried by the tape to a current collector, where the tape coating acts as the active electrode and fuel, when it is wet by an electrolyte completing the circuit to a cathode at which oxidant is supplied.

Dry tape carriers of fuel cell reactants offer still further advantages. The presence of free liquid in the cell can be completely eliminated, to achieve the advantages of a dry cell, which operates independently of gravity or of the position of the cell.

Thus, fluid materials can be applied to the tape separator in rupturable capsules. These may, for example, be what may be termed macrocapsules. If two tapes are sealed together around the periphery of defined areas, the space between can be a liquid trap. For example, the two tapes can be sealed down the sides and sealed across the stripes at intervals down their lengths. The open spaces between the sealed parts can then serve as liquid containers. The tape can be cycled past sharp points or the like which rupture the capsules before they get to the electrodes. Two such tapes, or a coating on either side of one tape, can supply the anode and the cathode feeds respectively.

Macroencapsulated fluid components can also be provided on the tape by having the tape include or carry rupturable capsules containing fluids enclosed in flexible polymeric walls. For example, capsules carried on the tape surface may contain an electrolyte solvent such as water, which is released by crushing the flexible capsules.

Conveniently, in a more sophisticated system, the electrochemical reaction components can be coated on the tape in the form of pressure-rupturable microcapsules. Encapsulation techniques produce minute droplets of liquid encased in a coating of film-forming materials such as polymers, which can be applied to a substrate such as paper to produce an adherent coating thereon. Various electrochemical systems have been devised in which a single liquid can serve the function of fuel and electrolyte, and another single liquid can serve the function of fuel and electrolyte. For example, the fuel-electrolyte solution may be an aqueous solution of methanol as the fuel and potassium hydroxide as the electrolyte. The oxidant-electrolyte liquid feed may be an aqueous solution of hydrogen peroxide. Thus fluid fuel-electrolyte and oxidant-electrolyte systems can be encapsulated and applied to opposite sides of a porous tape separator. Passage of the tape between closely spaced electrodes can exert sufficient pressure on it to rupture the capsules and thus release the reactants, as well as electrolyte.

Not only may the electrolyte, fuel and oxidant components of a fuel cell system be supplied to the electrodes by a moving tape system, but indeed, what may be regarded as the electrode itself may be provided by the tape.

A magnesium coating may readily be applied to one side of a separator tape, producing a laminated tape on which the magnesium is supplied as fuel to the electrochemical site. The other side of the tape may also be provided with a dry coating of oxidant-electrolyte solution enclosed in rupturable capsules, as discussed above.

When a laminate of the stated nature is used, the device at the anode site in the cell need be no more than a current collector. For example, it can be simply an electrically conductive contact, made of carbon, copper or the like, able to pick up and conduct away the electrons as they are released by solution of the metal in the electrolyte.

Similarly, a cathodic current collector, made of conductive materials as described such as carbon, may be used in conjunction with a tape carrying an active cathode material such as silver (II) oxide, wet for example with aqueous KOH as electrolyte. If desired, this tape can be laminated to a coating of zinc on the reverse side, to act as an active anodic material, whereby the device at the anode site may also be merely a current collector as above described.

An active anode material such as a metal like magnesium or zinc, and an active cathode material such as silver (II) oxide, function respectively as a fuel and as an oxidant, as well as functioning as active electrode materials. They are thus consumable electrode materials.

The tape carrier approach is not limited to consumable electrodes, either. While cathode and anode materials such as carbon and noble metals may be referred to as "inert," the nature of the electrode is recognized to have a definite, pronounced effect on the facility with which electrochemical reactions proceed. Factors involved in this may include catalytic activity of the electrode material in promoting the electrochemical reaction, effect of porosity in providing reaction sites and so forth. One of the factors involved in polarization of electrodes (decline in potential developed by the cell) seems to be an effect of saturation of active sites.

Active electrode materials such as platinum can be applied to tapes in very thin coatings by methods such as sputtering. Conductive carbon black can be mixed with electrochemical reactants to provide active electrode materials. The tape can thus carry a continuously fresh electrode surface to the electrochemical reaction site. As a result, the limits on the rate at which an electrode can deliver current by lack of sufficiently rapidly available reaction sites can be avoided. Again, here, the device at the reaction site can be merely a current collector, with the tape carrying the active electrode surface to it.

Indeed, as will be readily evident from the foregoing, the moving separator tape can advantageously carry every active component of the fuel cell, including fuel, oxidant, electrolyte fluid and on top of this, the active electrode surfaces (including catalysts), all in one package.

The information-recording tape of this invention need not carry the entire electrochemical system, including fuel, oxidant and electrolyte, to the active electrode sites: one or more of the components, such as an electrolyte solute (e.g., water), can be supplied separately. However, to make the tape completely self-sufficient, it preferably does carry the entire system, usually including the active electrode materials. In discussion hereinafter, reference made to current collectors implies that the tape does carry the active electrode materials; if it does not, electrodes will be used instead.

The electrochemical system can be carried on an edge or edges of the information-recording tape. Surprisingly small amounts of reactants are needed to actuate motion of the tape, and only small fractions of the surface, such as one-hundredth of an inch width, are needed to carry the electrochemical reaction components required. Locating the electrochemical reactants on an edge or edges of the tape also has the advantage that this portion of the tape base can be made of electrolytically permeable material, while the rest can be made of a non-permeable material, such as camera film, if desired.

If the information-recording tape base is an electrolytically permeable material, such as paper, the electrochemical system can be coated over its entire surface, if desired. This is especially advantageous when the process of recording information by the tape involves applying rupturing forces to the tape, by striking it with a typewriter or type-printing key for example, or indenting it, as with a sound recording needle. The means recording information by tape can then also rupture capsules of a fluid electrochemical component carried by the tape, activating the electrochemical system on the tape. If the key, needle or other information-recording means is a current collector, and the backing surface under the tape is also a current collector, an electrical circuit can thus be completed on rupture of the capsules, from which power can be drawn to actuate advancement of the tape. If an electrical conductor does not contact the tape on each side when the electrochemical system is activated by capsule rupture, as in a typewriter, where paper contacts the ribbon-tape on one side, the tape can be routed between current collectors after information is recorded by it, and current can then be drawn to actuate the tape motion.

Various arrangements can be made for collection of current from the tape as it moves past the active electrode sites. When the electrochemical system is coated on an edge of the tape, this edge can be contacted by rollers, rotating bands or sliding surfaces which are current collectors. Suitable arrangements can be made as needed to activate the electrochemical system as it moves past the active electrode sites, by having such current collectors rupture capsules on the tape by crushing pressure.

Provision must be made for electrical contact of the current collectors with the electrochemical system on the tape. The electrochemical system may be distributed over the information-recording surface, so that information-recording means can rupture encapsulated fluid to activate the system. If the information-recording surface is covered by an information-recording medium such as the pigment used in typewriter ribbons, this should be conductive, to permit the requisite electrical contact. For example, this pigment may be a conductive carbon black or the like.

The drive moving the tape can be any of a variety of devices powered by the electricity produced by the tape. In general, the power from the tape will be used to energize a small electrical motor, such as a DC permanent magnet gear-motor. This in turn can drive the tape by an arrangement such as a capstan drive, to advance it at substantially constant speed, or in a series of smal advancing steps, during operation.

The portion of the presently provided information-recording tapes carrying electrochemical cell reaction components will be an electrolytically permeable separator material. The remainder of the tape can be any material suitable for recording information, such as camera film, paper, cloth, a synthetic polymer or the like, which may or may not be electrolytically permeable.

In the practice of the invention, it should be understood that the tape may either have information recorded on it as in the case of a camera film or information recorded by it as would be the function of a typewrite ribbon.

Referring now to the figure, there is illustrated an embodiment of the invention as discussed above. Metal platen 10 is rotatably mounted in a conventional typewriter, the structure of which is not shown. Paper 11 is inserted in the typewriter and secured by roller 12. A dual tape 14 of the type described herein is fed from left to right past the impact point of key 15 on the paper by reel means 16 and 17 which are appropriately incorporated in a conventional typewriter. As noted before, the tape comprises an information recording zone 18 and a fuel cell tape zone 19 having, for example, an activating fluid contained in rupturable capsules. Key 15 is arranged to strike only the recording zone, in this case a carbon ribbon, leaving the fuel cell tape portion intact.

As the tape proceeds to the right, the fuel cell tape portion is contacted by key 20 which is operated in tandem with key 15. Key 20 serves the two fold purpose of activator and current collector functioning to crush the capsules of activating fluid such as an electrolyte and additionally completing an electrical circuit by contacting either the anode or cathode carried on the tape. As mentioned above the key may altenatively comprise a roller under tension whose rotation coupled with the rotation of the platen will continually supply fresh electrode sites.

Wire leads 21 and 22 from slip ring 23 mounted on platen 10 and from key 20 respectively are connected to a storage battery which is in turn connected directly to an electromechanical power source such as motor 24 for driving the typewriter. As illustrated the power released from the fuel cell is stored in a battery and then fed to the motor but alternatively may be fed directly to the motor and the power stored as mechanical energy by a flywheel, for instance, driven by the motor.

The separator materials in the tapes employed in the method of this invention can be made of any of a wide variety of substrate materials and binders. However, a particularly advantageous materials is a permeable non-woven, synthetic polymer base.

The separator must be permeable, having void spaces through which liquid can travel from face to face, to permit electrolytic contact between the anode and cathode, through absorption of the electrolytic in the separator. If it is so permeable that particles can drop through it, these particles will react at the opposite electrode and thus be lost to the electrochemical energy-producing reaction. If the separator is not permeable enough to let the electrolyte penetrate through it thoroughly, the internal resistance of the cell increases, and it is not possible to discharge the cell at a high rate. If the tape surface is not smooth, the electrodes do not contact it evenly over its entire surface, with consequent loss of capacity.

It is found that a permeable non-woven material, and particularly, a non-woven fibrous fabric material is an especially advantageous material for the separator base of this invention. While a woven fabric base has an irregular surface, preventing complete physical contact with flat electrode plates, and generally has a sufficiently open weave to permit particles to penetrate it, non-woven materials can be obtained with flat, quite smooth surfaces, coupled with substantial permeability to liquids, without having large enough holes in their structures to permit particles to fall through. For example, such non-woven fibrous fabric material can be obtained by compressing and heating a mat of polymeric fibers; while an adhesive, such as polyvinyl alcohol, for example, may be used as a binder in preparing such fibrous fabrics, particularly with thermoplastic fiber materials, the use of a binder is not necessary. In general, such non-woven fibrous fabric materials are free of the direct open void spaces extending from face to face which are characteristic of woven fabrics, and yet have substantial permeability to liquids. Permeable materials such as porous plastic films may also be used as tape bases, but at the small pore size preventing penetration by particles, these generally do not permit sufficiently thorough penetration by the electrolyte, resulting in limiting the cell to low discharge rates. On the other hand, non-woven fibrous fabric materials provide an advantageously suitable intermediate permeability, coupled with a smooth surface, permitting penetration by liquid electrolyte while limiting penetration by particles.

The separator can be made of any of a variety of materials, such as paper, cellulosics such as rayon, or the like. However, the separator is desirably a material resistant to attack by the electrolyte employed in the cell. Strong alkali solutions attack cellulosic materials, and accordingly, a preferred material for the separator base may be one inert to the action of aqueous alkali, such as an inert synthetic polymer, and particularly, a fiber-forming alkali-resistant synthetic polymer. A variety of alkali-resistant film- and fiber-forming polymeric materials are known which may be used in this connection, including for example a nylon (polyhexamethylene adipamide, polycaprolactam, polyhexamethylene sebacamide or the like), a hydrocarbon polymer such as polypropylene, an ester such as polyethylene terephthalate, a nitrile polymer such as polyacrylonitrile, and so forth.

The materials resistant to alkali attack, such as nylon and polypropylene, are also generally more resistant to oxidation than the cellulosics. As is known, cellulosics like paper are attacked by oxides in an aqueous medium, which leads to loss of the active material during coating, and weakens the base material.

It may sometimes be advantageous to employ, as a substrate, various other materials in the preparation of the separator base of the tape. The separator base may thus, if desired, comprise felts of fibers resistant to heat and to chemicals such as silicon carbide and asbestos, glass or the like, or it may be made of a cellulosic such as paper.

The separator base can also be an ion exchange membrane, comprising as the active species a synthetic resin provided with functional groups, which are acid groups for cationic permeability and hydroxy groups for anionic permeability.

In references to a tape herein, what is meant is a structure having two dimensions which are very large in relation to the third dimension, such as a sheet, the width and length of which are very much greater than the thickness. The width of the tape, furthermore, is usually desirably small in relation to its length.

Coatings may be provided on the web forming the separator base. These coatings may comprise, for example, materials which promote rapid wetting of the base by aqueous electrolyte solutions. For example, they may comprise hydrophilic cellulose derivatives, such as carboxymethyl cellulose, hydroxyethyl cellulose, and the like. The inclusion of surface active agents may be advantageous. Thus for example, the tape may carry a coating including an anionic surface active agent such as an alkyl aryl sulfonate like dodecylbenzenesulfonate sodium salt, or a sulfated alcohol such as the lauryl sodium sulfate. Synthetic resins of the urea-formaldehyde and melamine-formaldehyde type are desirably present in paper compositions to promote wet strength without appreciable sacrifice in absorbency. In general a size-free paper is desirable, to maximize absorbency. Fillers such as clay, chalk, or other metallic oxides or salts may or may not be present.

Coatings carried by the tape base will further advantageously include one or more fuel cell reaction components.

The weight of reactants applied per area of tape surface will vary depending on the intended current drain.

Metallic coatings may be applied to the base by a variety of methods, to provide a consumable anode material. A base may be sputter-coated with a metal like magnesium or zinc, or it may be laminated to a metal foil such as aluminum foil, using hide glue, ethyl cellulose, or like adhesives. Metallic coatings on the tape may also comprise catalytically active electrode materials such as platinum, palladium, or the like, applied by means such as those above mentioned.

Coatings on the separator may also comprise dry solid electrochemical relation components, other than the consumable anode metals, such as powdered conductive carbon and fuels, oxidants and electrolytes which are solid at room temperature. The coating may also include fibers, such as graphite fibers to improve cohesion of the coatings. Application of such dry solids to a base can conveniently be effected by means conventional in the art for coating paper, such as mixing the dry solid with an adhesive solution and applying it to the paper base surface. The adhesive employed, for example, may conveniently be a polymer such as polyvinyl alcohol.

Liquid or gaseous fuel cell reaction components carried by the dry tape will be enclosed in capsule walls, with the walls being formed of polymeric material. Methods of adhering polymeric materials to bases such as paper tapes are readily available. For example adhesives may be used or the polymeric material may be contacted with the paper while it is fluidized by being heated above its melting point or wet with a solvent or fluid swelling agent. Polymers which may be used to form the walls of the capsules enclosing the fluid carried by the tape may comprise, for example, flexible thermoplastics such as polyvinyl chloride, polyethylene, polymers of tetrafluoro- and chlorotrifluoroethylene, polyvinyl acetate, and so forth, or a film-forming polymeric material of natural origin which is a hydrophilic colloid such as gum arabic, gelatin or the like. Means employed to produce enclosure of fluids in a closed cell plastic wall can be, for example, forming a tube of the polymeric material, into the hollow center of which the fluid is loaded; bubbling gas into or dispersing a liquid into a fluid melt of the polymer, or the like. Microcapsules of liquid are conveniently produced by suspending the liquid in a fluid medium with which it is immiscible, and in which a film-forming material is dissolved. Thus for example, dinitrobenzene may be dispersed in water containing dissolved hydrophilic colloids such as gum arabic and gelatin. The immiscible liquid is agitated in the fluid medium to form tiny droplets coated by the fluid medium, and then the film-forming material is caused to solidify, producing enclosure of the liquid in walls of the solidified, film-forming polymer. Colloids such as gum arabic and gelatin are coacervated by means such as changing the temperature or pH of the medium. The resulting suspension of encapsulated liquid can then be coated onto a surface such as paper, to which it will adhere on drying, forming a coating of pressure-rupturable, fluid-containing capsules.

Polymeric coatings may also be provided on solid reactants adhered to the tape surface, using for example a water soluble polymer like polyvinyl alcohol to adhere a powder to the tape surface, providing it also with a protective coating removable by exposure to aqueous media at the time of use.

The coatings comprising fuel cell reaction components will be suitably applied to the tape so that in use, the tape base will be wetted by an aqueous solution of electrolyte, fuel will be provided on one face of the base at the anode and in contact with the electrolyte solution, and oxidant will be provided on the opposite face, contacting the cathode, and in contact with the electrolyte solution. Thus for example, the tape may be provided with a plurality of coatings, such as a face of magnesium on a paper base coated on the opposite face with a first layer of dry ammonium bromide and a second layer upon this of microcapsules comprising dinitrobenzene and water, disposed so that pressure ruptures the capsules permitting the solution to wet the ammonium bromide, which then soaks into the paper base to provide an aqueous solution of ammonium bromide wetting the magnesium face. Separate layers, however, will often not be essential: for example, the electrolyte and fuel may usually be mixed in a single layer, and so forth.

Any suitable current collectors may be used as the material leading to the point where the electrodes are placed in electrical contact through the tape separator. Where the current collectors comprise the electrodes, they are desirably not only conductive materials but also adsorb the reactants employed, and act as catalyst for the electrode reactions. Suitable current collector and electrode materials include conductive carbon and copper, noble metals such as platinum, palladium, iridium, rhodium and the like, transition metals such as nickel, and so forth. The electrode surface can advantageously be activated, by deposition of a porous material such as platinum or palladium black, which can be deposited if desired on plates of metals such as stainless steel, iron or the like to form the electrode. Metal oxides such as oxides of iron, magnesium, cobalt, copper and the like may also be used as activating electrode surfaces. The electrode or current collector materials may be used in sheet form or in the form of screens, meshes or other types of porous bodies, or as rollers, rings, or like configurations. Preferably, they have elongated surfaces, to minimize current density.

As will be apparent from the foregoing discussion, any of a wide variety of fuels, electrolytes and oxidants may be employed in actuating motion of a tape in accordance with this invention. Descriptions of useful fuel cell reaction components are extensively available in published literature.

The fuel, for example, is sometimes a metal, and in this connection, metals which may be employed as consumable anodes include for example the alkali metals such as lithium, sodium, potassium, Group I–A metals such as copper and silver, Group II metals such as magnesium, calcium, strontium, zinc and cadmium, Group III metals such as aluminum, Group IV metals such as tin, and so forth. The metals may be used individually or in mixtures such as the amalgam of sodium with mercury and the like. Gaseous reductants include for example hydrogen, natural and manufactured gas, light hydrocarbons such as propane and butane, inorganic gases such as ammonia, and so forth. Liquid and solid organic and inorganic fuels, including compounds such as methanol, formaldehyde, formic acid, hydrazine, urea, guanidine and the like, generally have the advantage of being relatively cheap and easy to handle, more reactive than hydrocarbons, and soluble in the electrolyte solution, and form an especially preferred class for convenient utilization.

On the oxidant side, air and oxygen are among the most generally studied gaseous anode feed materials. Oxygen carriers such as hydrogen peroxide and various oxides and oxy acids (reducible compounds having one or more oxygen atoms, including peroxides) are also useful. Exemplary of such acids are nitric, sulfuric and persulfuric acids. Illustrative of inorganic oxides which may be employed as gases like $NO_2$ and $SO_2$, and salts such as sodium peroxide, potassium peroxide, vanadium pentoxide, manganese dioxide, and the like. Also included in this group are salts of oxy acids such as sodium, potassium, lithium, barium, magnesium or calcium chromates, perclorates, permanganates, and the like. Organic oxidants can also be employed as oxygen carriers for the cathode feed and in this connection, advantageous because of the high electron exchange number involved in their reduction are nitro compounds such as nitrobenzene, meta-dinitrobenzene, 2-chloro-5-nitrolpyridine, 4-nitropyridine-N-oxide, 8-nitroquinoline, p-nitrophenol, tetranitromethane and the like, as well as nitroso compounds such as p-nitrosodiethylaniline, sodium p-nitrosophenolate and the like. Halogens and halogenated compounds can also be used instead of oxygen-carrying compounds, as cathode feed materials. These may be gaseous halogens, such as bromine, fluorine and so forth, or organically bound halogen, as provided by compounds such as N,N'-dibromodimethylhydantoin, N,N' - dichlorodimethylhydantoin, N,N - dichloro-p-toluenesulfonamide, 2-chloronitropropane, and the like.

Electrolytic connection between the anode and cathode of fuel cells operating at relatively low temperatures such as about 100° C. or below is generally provided by an aqueous solution of an ionizing compound, which may be basic, such as 40% KOH, or acidic, such as 7 molar sulfuric acid, or neutral, such as 1 molar sodium sulfate, 2 molar ammonium or magnesium bromide and the like. Sometimes a solution is both reactant and electrolyte, as is the case for example with aqueous nitric acid used as an oxidant. The electrolyte solvent may be an ionizing liquid other than an aqueous solution, such as liquid ammonia or organic solvents. Fixed electrolyte, in the form of a hydrated ion exchange membrane, can also be employed, as in the hydrogen/oxygen cell.

While the invention has been described with reference to various particular preferred embodiments thereof, it is to be understood that variations and modifications can be made without departing from the scope of the present invention, which is limited only as defined in the following claims.

What is claimed is:

1. Electrically powered self-actuated apparatus for recording intelligence comprising in combination:

(a) a tape, a portion of said tape disposed to release electrochemical energy and a portion of said tape disposed for recording information;

(b) means for moving said tape through said apparatus;

(c) means for recording information in conjunction with said tape as said tape is moved through said apparatus; and (d) a pair of electrodes for collecting said energy from said tape as said tape is moved through said apparatus; and (e) means for supplying said energy to said apparatus.

2. The apparatus of claim 1 wherein said portion of said tape disposed to release electrochemical energy comprises a dry tape fuel cell.

3. The apparatus of claim 2 wherein said dry tape fuel comprises an electrolytically permeable base carrying fuel, oxidant and electrolyte and an electrochemical reaction component enclosed in rupturable capsules.

References Cited

UNITED STATES PATENTS

| | | |
|---|---|---|
| 2,528,005 | 10/1950 | Kline. |
| 2,864,748 | 12/1958 | Mones. |
| 3,260,620 | 7/1966 | Gruber. |

WINSTON A. DOUGLAS, Primary Examiner

A. SKAPARS, Assistant Examiner

U.S. Cl. X.R.

101—46; 136—83, 86, 90; 197—172; 204—2; 222—30; 235—2; 346—134